Feb. 17, 1931. E. E. GOLD 1,792,490
COUPLER FOR HOSE OR PIPE ENDS
Filed March 28, 1929
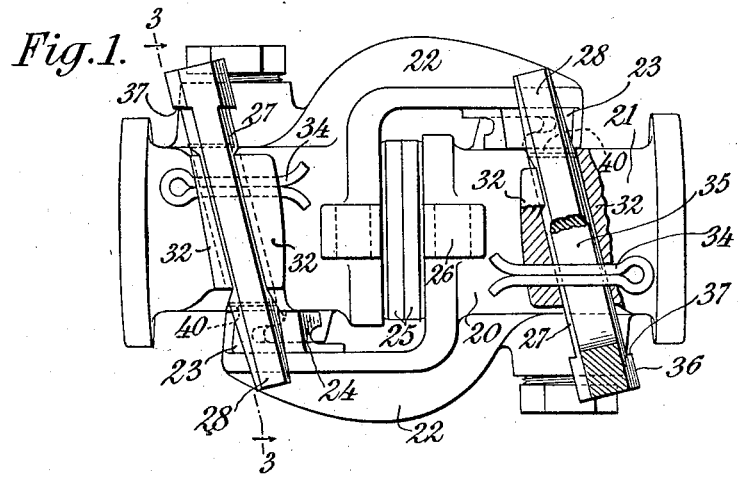
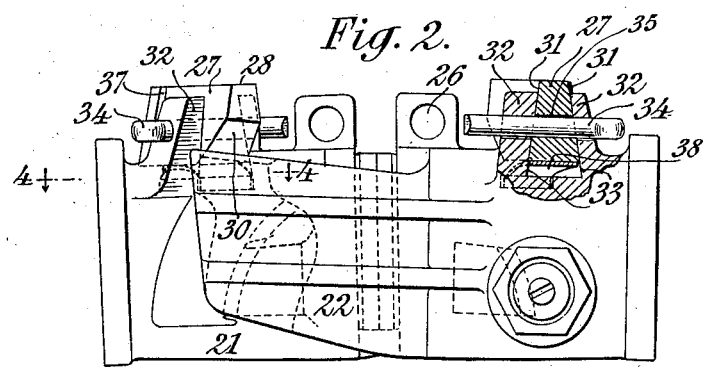
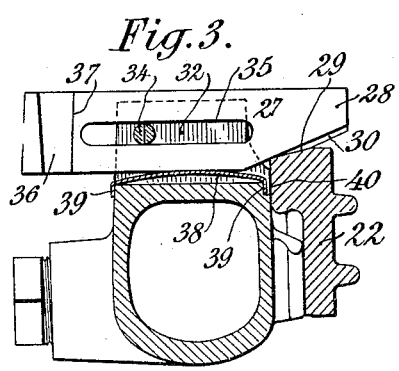
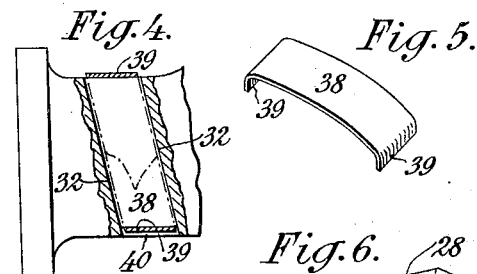
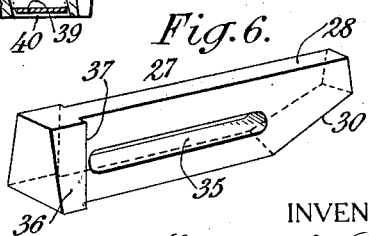
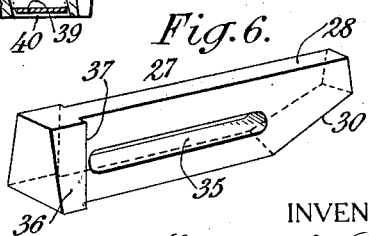
INVENTOR:
Edward E. Gold,
By Attorneys,
Fraser, Myers & Manley.

Patented Feb. 17, 1931

1,792,490

UNITED STATES PATENT OFFICE

EDWARD E. GOLD, OF NEW YORK, N. Y., ASSIGNOR TO GOLD CAR HEATING & LIGHTING COMPANY, OF BROOKLYN, NEW YORK, A CORPORATION OF NEW YORK

COUPLER FOR HOSE OR PIPE ENDS

Application filed March 28, 1929. Serial No. 350,464.

This invention relates to improvements in couplers for hose or pipe ends of the type commonly used to detachably connect the hose ends or flexible end sections of the train pipes of railway cars.

It is an object of the invention to provide an improved key lock for such couplers which shall be more or less universal in use, whereby a coupler provided with the improved locking device may be coupled with any one of a number of similar standard couplers in common use and satisfactorily held in locked relation by the improved locking means even though the two couplers may vary considerably as to dimensions and relative positions of the parts with which the locking element cooperates.

It is a further object of the invention to provide a coupler with a locking key having a portion adapted to be driven into a wedge-like relation with a complemental coupler and at the same time held in a wedge-like relation with respect to parts of the coupler in which it is mounted.

Another feature of the improved coupler consists in so mounting the key in the coupler that it need not be limited in depth to the depth of the key-way. It thus provides means whereby the key may be made of any desired strength at its locking end without the necessity of providing a key-way of excessive depth involving an unprofitable use of metal.

The features of improvement also include a spring so positioned as to maintain the key in a wedge-like relation with respect to the walls of the slot in which it is mounted so as to hold it firmly in any position in which it is placed, and a pin-and-slot connection to limit the extreme range of movement of the key, which has a lug so positioned as to be brought into contact with a wall of the coupler and thereby prevent it from being driven to a position such as to shear the pin. The end of the spring is mounted in a novel manner within a recess in the coupler providing sufficient space for expansion without causing the spring to be projected into the path of movement of a complemental coupler.

In the accompanying drawings illustrating the preferred form of the invention,—

Figure 1 is a top view of a pair of complemental couplers having improved locking keys embodying the invention, the keys being represented in their effective locking positions.

Fig. 2 is a side view of the pair of couplers illustrated in Fig. 1, part of the right-hand coupler being represented in cross-section along a plane passing through the key and key-way.

Fig. 3 is a view in cross-section through the left-hand coupler of Fig. 1, the section being taken along the plane represented by the line 3—3 looking in the direction indicated by the arrows.

Fig. 4 is a cross-sectional view through the key-way of the left-hand coupler illustrated in Fig. 2, the section being taken along the plane represented by the line 4—4 and viewed in the direction indicated by the arrows, the key being omitted.

Fig. 5 is a perspective view of one of the leaf-springs adapted to be confined between the bottom of the key and the base of the key-way.

Fig. 6 is a perspective view of one of the keys removed from the key-way in the coupler.

Referring first to Figs. 1 and 2 of the drawings, each coupler comprises a body or head portion 20, having a neck 21 by which it may be secured to a suitable fitting provided for such purpose at a hose end or jointed end section of a train pipe, and a locking arm 22 having a cam-like overhanging flange 23 adapted for engagement with a cam-like flange 24 projecting outwardly from the side of a complemental coupler.

The adjacent end ports of the couplers, which are held in a state of close communication when they are in their interlocking relation, may be provided with gaskets 25 of any suitable type.

The couplers may be provided with perforated lugs 26 by means of which they may be suspended from the car end or other supporting structure when not in use. The perforated lug 26 of each coupler is adapted to receive the hook of a coupler of a well-known type when occasion requires that it be mated with a coupler of the type herein disclosed.

Couplers like those illustrated in Figs. 1 and 2 are coupled by bringing them together with their opposed ends inclined upwardly so that the flange of the arm 22 of each coupler is slightly above the flange of the adjacent projection 24 of the other coupler. The ends of the couplers are then lowered, each coupler being given a slight movement of rotation, the right-hand coupler in a counterclockwise direction and the left-hand coupler in a clockwise direction (Fig. 2), thereby bringing the cam-like flanges of the arms 22 and projections 24 into an interlocking relation with the two gaskets held tightly against each other in positions of mutual registration.

The relative form and location of the cam-like flange on each arm 22 and on each projection 24 are such as to prevent further relative movement of the couplers when they attain their normal positions with the axes of their heads or body portions in alignment, in which position they are normally maintained by the force of gravity unless uncoupled by lifting their ends and imparting rotational movements the reverse of those through which they are turned when being coupled.

Although, as above described, the force of gravity tends to maintain the couplers in their coupled relation, it has been found impracticable to depend altogether upon such natural agency, since the couplers may become accidentally uncoupled as a result of the swinging or swaying motions imparted to the hose ends or pipe sections when the cars to which they are attached are in motion. For this reason various fastening means have been provided whereby the couplers may be positively locked in their coupled relations. One form of locking device which has been used for this purpose as applied to couplers of the type herein illustrated comprises a wedge or key 27 which may be driven through a key-way provided therefor in some appropriate part of the coupler and so positioned that the end 28 of the key may extend over the end of the arm 22 of a complemental coupler. Although each coupler may be provided with such a wedge or key, a single locking device of the character described in one coupler, when driven to its effective position, satisfactorily locks the two couplers in their coupled relation and prevents unintentional disengagement.

Couplers and locking devices of the character thus far generally described are well known in the prior art (see, for example, U. S. Patent No. 1,056,184, issued March 18, 1913, to Frederick T. Kitchen), and of themselves constitute no part of the invention to be protected, which will now be more particularly described.

It has been found as a result of experience that the insertion of the wedge or key 27 used on couplers of the above-described character is sometimes rendered quite difficult and is sometimes absolutely prevented if the upper surface 29 (Fig. 3) of the locking arm 22 of one coupler immediately opposite the end of the key-way in the other coupler is at a level slightly higher than the bottom of the key-way. Such difference in level may occur because of difficulty in bringing two coupler heads into exact alignment. It also frequently occurs when a coupler of one size is coupled with a coupler of another size, or when a coupler of one make is coupled with another coupler of a different make but of which the relative proportions and dimensions are slightly different. It is an object of this invention to provide an improved key lock or wedge lock so modified as to be more or less universal in its application and capable of locking various standard couplers of the prior art, notwithstanding slight differences in form and proportion.

To this end the key or wedge 27 of a lock embodying the invention is provided with a locking end 28 which is beveled or otherwise inclined upwardly as at 30 (Fig. 3) so as to provide a cam-like under surface adapted to be driven into a wedge-like engagement with the upper surface 29 of a complemental coupler. The inclined surface 30 is of a length such as to be brought into a locking relationship with surfaces 29 at different levels. Should the surface 29 be somewhat higher than that indicated in Fig. 3, the key will come into locking engagement therewith before it has been driven quite as far to the right as it is indicated as having been driven in the drawing. Should the surface 29 be at a level somewhat lower than that indicated in Fig. 3, the wedge will have to be driven to a position further to the right than that illustrated in the drawing.

In order that the key may not be bent or broken when driven into its engaging relation with the surface 29 of the arm 22, it should be of sufficient depth to provide an ample amount of metal above the beveled surface at its locking end. To provide for this without making it necessary to unduly increase the amount of metal in the key-way, the key has been mounted in the coupler in a novel manner which constitutes an important feature of the invention. This novel method of mounting the key in the key-way consists in making the bottom of the key of greater width than the top, and in providing a key-way therefor consisting of an undercut slot which permits the upper portion of the key to extend through the slot to any desired height above the top of the key-way. In the form illustrated in Fig. 2 the key is made of a wedge-shaped form in cross-section having upwardly-converging lateral surfaces 31, and is mounted in a key-way comprising a slot the walls 32 of which have upwardly-converging inner surfaces 33 disposed at angles corresponding with the angles of the lateral surfaces of the key. This form of key and key-way makes it possible to use a key of any desired depth in a key-way which may be of materially less depth.

The inclined surface 30 at the front of the key and the inclined lateral surfaces of the key and key-way cooperate with each other in an important manner to effect a satisfactory lock. When the key is driven through the key-way to the position indicated in Fig. 3, the inclined surface 30 engages the surface 29 at the end of the locking arm 22 of the complemental coupler and first tends to drive it home to its normal coupling position. A further tap on the key tends to force its end upward in the key-way, thus bringing the key into a wedging relationship with the parts of the coupler in which it is mounted, whereby the key will be firmly held in its locked position until released by a blow imparted to the end 28.

The extreme movement of the key in the coupler may be limited by means of a cotter-pin 34 inserted through openings in the walls 32 of the key-way in a position such as to pass through a slot 35 in the key. In order that the key may not be accidentally driven through the key-way to a position such as to cause the cotter-pin to be sheared by the wall of the key at the end of the slot, the key may be provided with one or more lugs or extensions 36 providing a shoulder or shoulders 37 so positioned as to be brought in contact with the adjacent wall of the coupler before the wall at the nearest end of the slot comes in contact with the cotter-pin.

After the key has been driven to its "release" position and its coupler separated from the complemental coupler, it is important that the key remain in its "release" position with its end 28 clear of the path of movement of the complemental coupler, so that a re-coupling will not be interfered with. This end has been accomplished by confining between the under surface of the key and the bottom of the slot an arc-shaped metal spring 38 (Figs. 2, 3, 4 and 5), having its ends 39 turned downwardly at the ends of the key-way. The spring should be of sufficient strength to hold the key in a wedging relationship between the inclined walls of the key-way and under a pressure such as to prevent accidental endwise movement.

It is also important that the end of the spring shall not be moved into the path of movement of a complemental coupler during a coupling or uncoupling operation. To avoid such obstruction the wall of the coupler at the end of the key-way nearest the complemental coupler is recessed as at 40 (Figs. 3 and 4) to receive the adjacent end 39 of the spring, the depth of the recess being sufficiently greater than the thickness of the spring to permit the latter to be flattened by the key without causing its end to extend beyond the surface of the coupler.

From the foregoing description it will be apparent that a pair of couplers when locked together as indicated in Figs. 1 and 2 will remain firmly locked by the wedging action at the front end of each key, which causes it to be lifted into a wedging relation with the walls of the keyway. When it is desired to uncouple the couplers, a blow is imparted to the ends 28 of each key, thus causing it to be moved back in the key-way until its extremity is removed from the path of uncoupling movement of the end of the complemental coupler. The two couplers may then be separated and the key will be maintained in its position free of the path of movement of a complemental coupler by the spring which holds it in a firm frictional engagement with the converging walls of the key-way. The cotter-pin passing through the slot 35 in the key prevents the key from being driven entirely through the key-way so as to be separated from the coupler and lost. The shoulders 37 at the rear end of the key prevent the key from being driven too far through the key-way in the opposite direction by a blow which might be imparted thereto at a time when the movement of the key is not opposed by the end of a complemental coupler. A blow at such time might, if it were not for the shoulders 37, cause the wall at the end of the slot to shear the cotter pin. When it is desired to remove the key for purposes of replacement, this may readily be effected by withdrawing the cotter pin.

The invention is not intended to be limited to the specific form herein disclosed for purposes of illustration, but should be regarded as including modifications and variations thereof within the scope of the appended claims.

What is claimed is:

1. A pipe coupler having an open-top undercut slot therein, a key movable endwise in said slot, of a length greater than that of the slotted portion of the coupler, so that it may be driven to a locking position in which its end extends into the path of uncoupling movement of a surface of a complemental coupler, said key having a cross-sectional form the lower portion of which is wider than that of the upper portion of the slot, so as to prevent it from being lifted out of said slot and having an inclined surface at the end adjacent the complemental coupler to be brought into a wedge-like contact with a surface thereof at varying levels.

2. A coupler, as defined by claim 1, having a key the depth of which is greater than that of the slot in which it is retained.

3. A coupler, as defined by claim 1, of which the slot has side walls the inner surfaces of which are plane and converge from the bottom of the slot to the surface of the coupler, and of which the key has complemental convergent side walls so as to exert a wedge-like action in the slotted part of the coupler when forced towards the open side of the slot.

4. A pipe coupler having an undercut slot in its upper surface, a key of wedge-shaped form in cross-section movable endwise in said slot, the cross-sectional form of the slot corresponding with that of the adjacent portion of the key, and one end of the key having an inclined under surface adapted to be driven into a wedge-like engagement with the adjacent surface of a complemental coupler, thereby causing the key to be forcibly held in a wedging relation with respect to the inclined walls of the slot.

5. A pipe coupler having an undercut slot in its upper surface, a key of wedge-shaped form in cross-section movable endwise in said slot, the cross-sectional form of the slot corresponding with that of the adjacent portion of the key, and a spring confined between the surface of the coupler at the bottom of the slot and the adjacent surface of the key, thereby tending to maintain the key in a wedging relation with the inclined walls of the slot.

6. A pipe coupler, as defined by claim 5, of which the spring comprises an arc-shaped leaf of resilient metal having its crown in contact with the under surface of the key and its ends turned down over surfaces of the coupler at the ends of the slot.

7. A pipe coupler, as defined by claim 5, of which the spring comprises an arc-shaped leaf of resilient metal having its crown in contact with the under surface of the key and its ends turned down over surfaces of the coupler at the ends of the slot, the surface for the end of the spring at one end of the slot being set in from the outer surface of the coupler to form a recess for the downturned spring end of greater depth than the thickness of the spring.

In witness whereof, I have hereunto signed my name.

EDWARD E. GOLD.